United States Patent
D'Urso

(10) Patent No.: US 9,381,962 B2
(45) Date of Patent: Jul. 5, 2016

(54) PASSENGER VAN

(71) Applicant: DUR-A-BUS COACH BUILDERS LTD., Toronto (CA)

(72) Inventor: Lorenzo D'Urso, Maple (CA)

(73) Assignee: DUR-A-BUS COACH BUILDERS LTD., Toronto (CA)

( * ) Notice: Subject to any disclaimer, the term of this patent is extended or adjusted under 35 U.S.C. 154(b) by 0 days.

(21) Appl. No.: 14/484,789

(22) Filed: Sep. 12, 2014

(65) Prior Publication Data

US 2016/0075388 A1 Mar. 17, 2016

(51) Int. Cl.
*B62D 31/00* (2006.01)
*B62D 65/14* (2006.01)
*B62D 31/02* (2006.01)
*B62D 31/04* (2006.01)
*B60N 2/01* (2006.01)

(52) U.S. Cl.
CPC *B62D 65/14* (2013.01); *B60N 2/01* (2013.01); *B62D 31/02* (2013.01); *B62D 31/04* (2013.01)

(58) Field of Classification Search
CPC ........ B62D 65/14; B62D 31/02; B62D 31/04; B60N 2/01
USPC ............................................. 296/65.03, 178
See application file for complete search history.

(56) References Cited

U.S. PATENT DOCUMENTS

| | | | | |
|---|---|---|---|---|
| 1,864,710 A * | 6/1932 | Austin | B62D 31/04 | 296/64 |
| 5,529,378 A * | 6/1996 | Chaban | B60N 2/01508 | 297/331 |
| 5,788,329 A * | 8/1998 | Pilarczyk | B60P 3/38 | 297/354.13 |
| 8,371,589 B2 * | 2/2013 | Bartel | A61G 3/061 | 280/6.152 |
| 8,585,116 B2 * | 11/2013 | King | B62D 33/03 | 296/24.33 |
| 8,702,145 B2 * | 4/2014 | Cao | B60R 5/045 | 296/37.16 |
| 8,770,646 B2 * | 7/2014 | Line | B60N 2/0232 | 296/209 |
| 8,899,654 B2 * | 12/2014 | Ellsworth | 296/84.1 | |
| 2008/0036240 A1* | 2/2008 | Lusk | B60R 16/0207 | 296/178 |
| 2009/0039679 A1* | 2/2009 | Karagitz | B60R 5/04 | 296/193.07 |
| 2010/0078956 A1* | 4/2010 | Aebker | B60R 5/04 | 296/37.13 |
| 2011/0084521 A1* | 4/2011 | Shellenberger | B60J 1/007 | 296/193.08 |
| 2011/0121603 A1* | 5/2011 | Blatseas | B60N 2/01583 | 296/64 |
| 2011/0248521 A1* | 10/2011 | Jackson | B60R 5/04 | 296/193.07 |

OTHER PUBLICATIONS

DUR-A-BUS Brochure, Ontario Transportation Expo, Apr. 12-15, 2013, Toronto, ON. BusCon Expo, Sep. 10-13, 2013, Chicago, IL. pp. 1-2.

* cited by examiner

*Primary Examiner* — Pinel Romain
(74) *Attorney, Agent, or Firm* — Lando & Anastasi, LLP

(57) ABSTRACT

The van can be produced by a van modification wherein a portion of the bed in front of the rear doors and behind the rear wheels is removed. A pan is installed; the pan floor lies below the space occupied by the portion removed. A shelf is installed above the pan floor to define a suitcase rack. Seats are installed upon the shelf. An oversized windshield is installed. A seat grouping is arranged behind the driver and below the shelf. A seating row is arranged in front of the shelf row and immediately behind the grouping and disposed above the grouping and below the shelf. A seating row is arranged immediately in front of the shelf row and immediately behind the row of seats arranged immediately behind the grouping. The row arranged immediately in front of the shelf is below the shelf and above the seats immediately behind the grouping.

10 Claims, 20 Drawing Sheets

PASSENGER VAN

FIELD OF THE INVENTION

The invention relates to the field of passenger vans.

BACKGROUND OF THE INVENTION

It is well known to modify vans.

SUMMARY OF THE INVENTION

Forming one aspect of the invention is a method. The method comprises the steps of: removing a portion of the rear bed of a van, the portion lying immediately in front of the rear doors of the van, behind the rear wheels of the van and spanning substantially between the side walls of the van; securing to the frame of the van a luggage pan, the pan having a floor that lies below the space occupied by the portion of the rear bed prior to removal thereof, the pan further having sidewalls that sealingly couple the floor of the pan to the floor of the vehicle; and installing a shelf in the van in vertically spaced relation to the floor of the pan to define a suitcase rack between the floor of the pan and the shelf.

According to another aspect, the method comprises the step of installing a row of seats upon the shelf.

According to another aspect, the method further comprising the steps of: removing a portion of the front cabin of the van, the portion lying above the front windshield of the van and spanning substantially between the sidewalls of the van; removing the windshield of the van; and installing an oversized windshield in the space occupied by the windshield and the portion of the front cabin prior to removal thereof.

According to another aspect, the van is selected from the group consisting of the 2500 and 3500 series manufactured by the Mercedes-Benz division of Daimler AG.

The method can be used to produce a modified van which forms another aspect of the invention.

According to another aspect of the invention, the modified van can further comprise: a grouping of seats arranged behind the driver and disposed at an elevation below that of the row on the shelf, the grouping being defined by at least two rows of seats; and a row of seats arranged in front of the row on the shelf, arranged immediately behind the grouping and disposed at an elevation above that of the grouping and below that of the row on the shelf.

According to another aspect of the invention, the modified van can further comprise a row of seats arranged immediately in front of the row on the shelf and arranged immediately behind the row of seats arranged immediately behind the grouping.

According to another aspect of the invention, the grouping can be defined by three rows of seats.

According to another aspect of the invention, the row of seats can be arranged immediately front of the row on the shelf is disposed at an elevation below the elevation of the row of seats on the shelf and above the elevation of the row of seats immediately behind the grouping.

Other advantages, features and characteristics of the invention will become apparent upon a review of the following detailed description, with reference to the appended drawings, the latter being briefly described hereinafter.

BRIEF DESCRIPTION OF THE DRAWINGS

FIG. 13B is a view along 13B-13B of FIG. 13.

DETAILED DESCRIPTION OF THE EXEMPLARY METHOD

Figure 1:
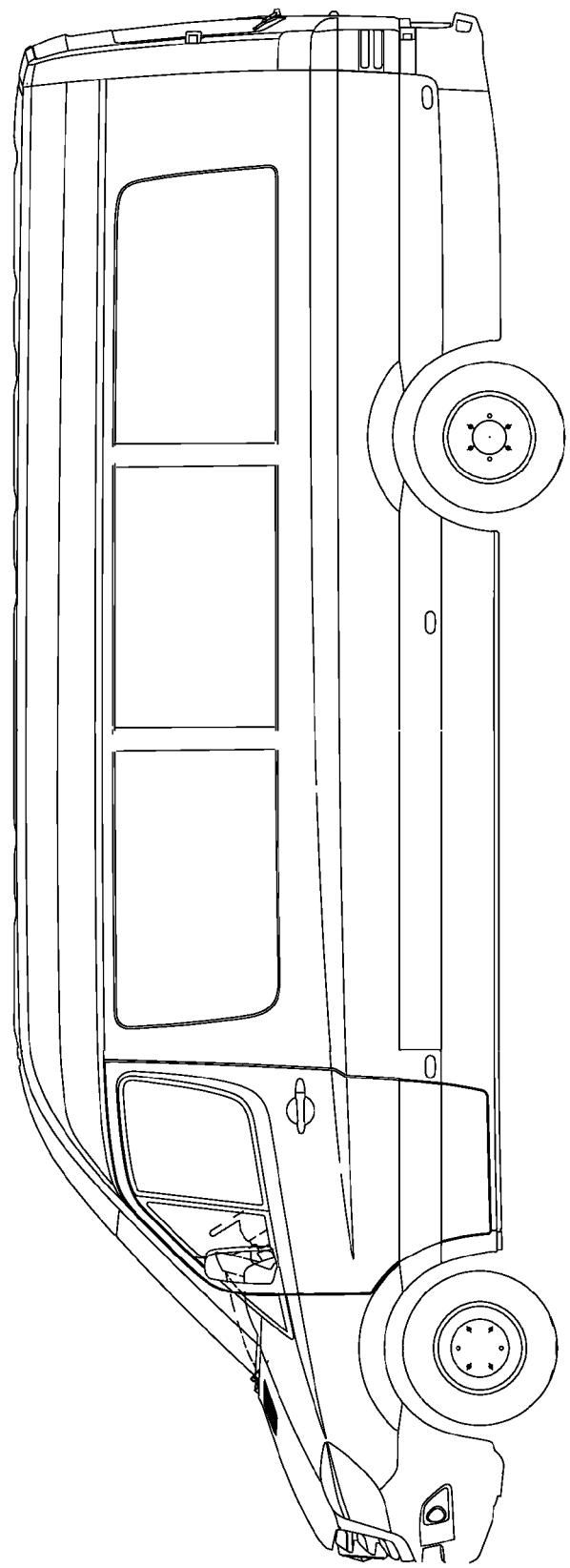
FIG. 1 is a side view of a prior art van.
Figure 2:
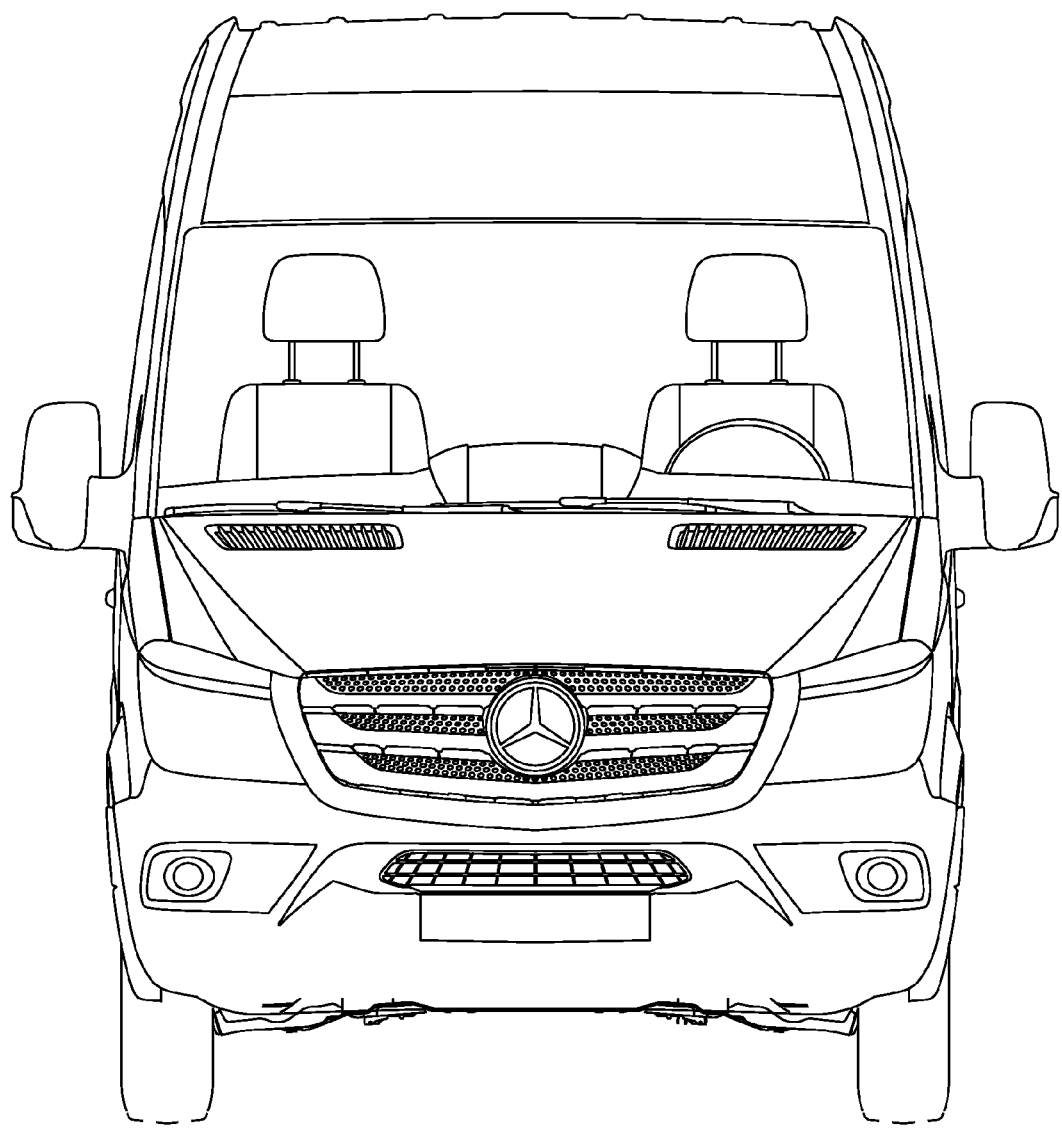
FIG. 2 is a front van of the van of FIG. 1.
Figure 3:
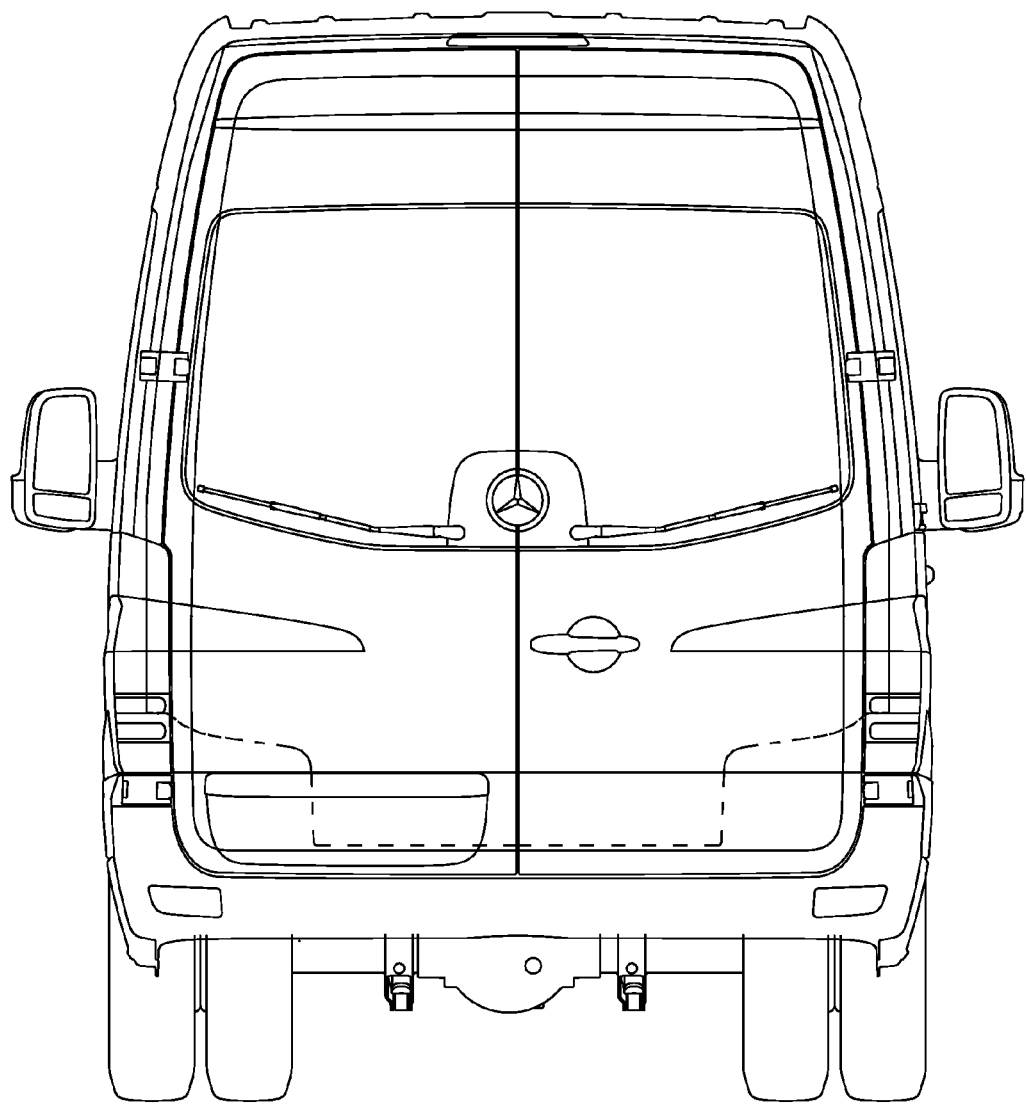
FIG. 3 is a rear view of the van of FIG. 2.

The exemplary method is for use with a 2013 Sprinter™ van, that is, a van selected from the group consisting of the 2500 and 3500 series manufactured by the Mercedes-Benz division of Daimler AG, all as shown in FIGS. 1-3.

The method involves three modifications to the van: a luggage modification; a window modification; and a seat modification.

Luggage Modification

Figure 4:
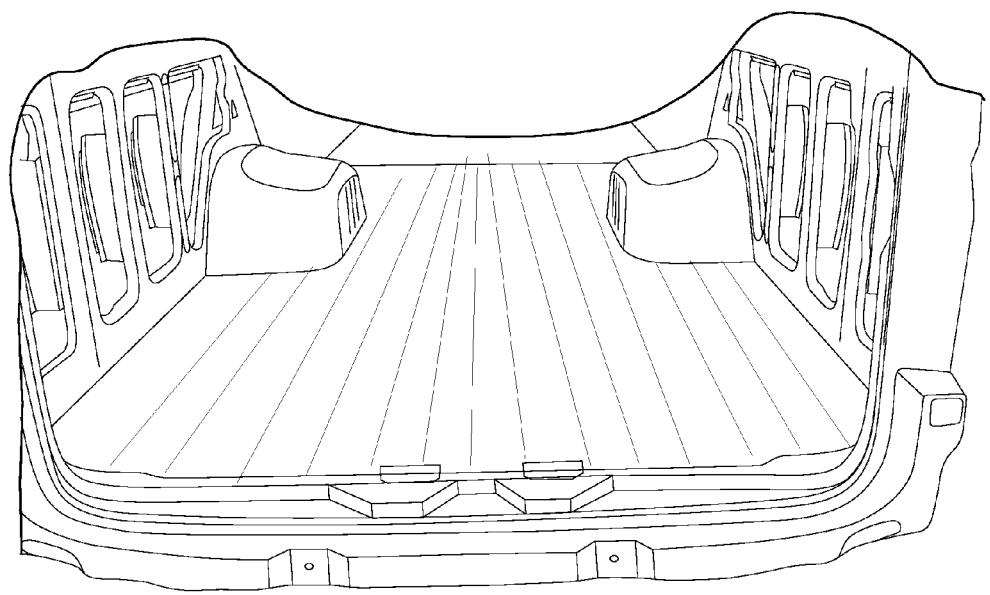
FIG. 4 is a perspective view of a subframe used in a method according to an exemplary embodiment of the invention.
Figure 5:
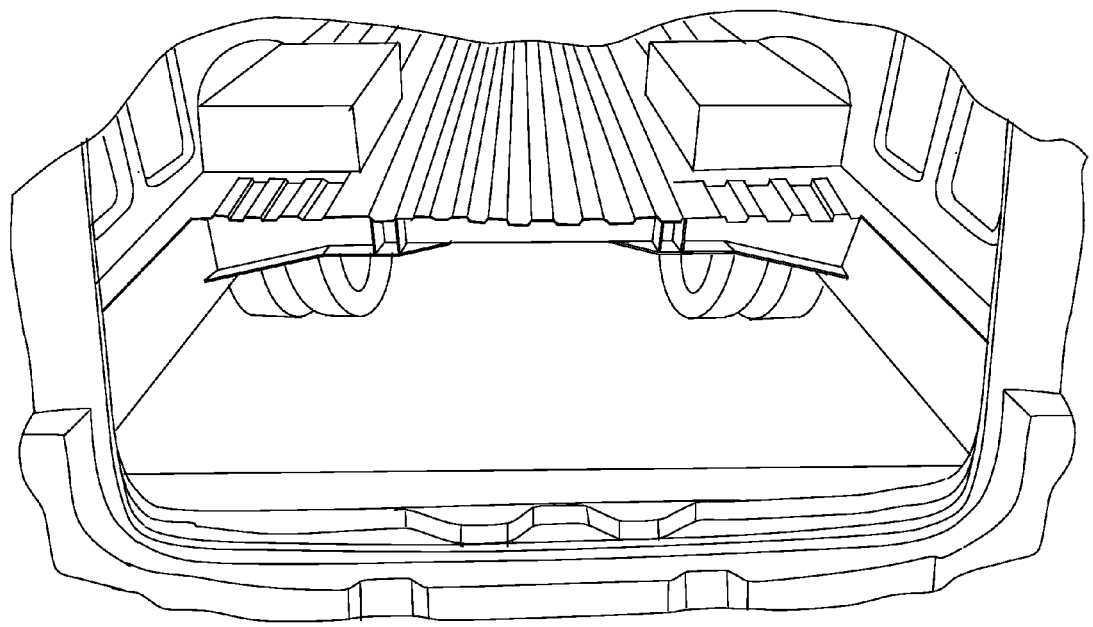
FIG. 5 is a rear view of the structure of FIG. 4.

As a first step in the luggage modification, a portion of the rear bed of a van is removed, the portion lying immediately in front of the rear doors of the van, behind the rear wheels of the van and spanning substantially between the side walls of the van. The removal is shown by the sequence of FIGS. 4-5; the portion that is so removed is delineated by the dotted line in FIG. 4.

Figure 6:
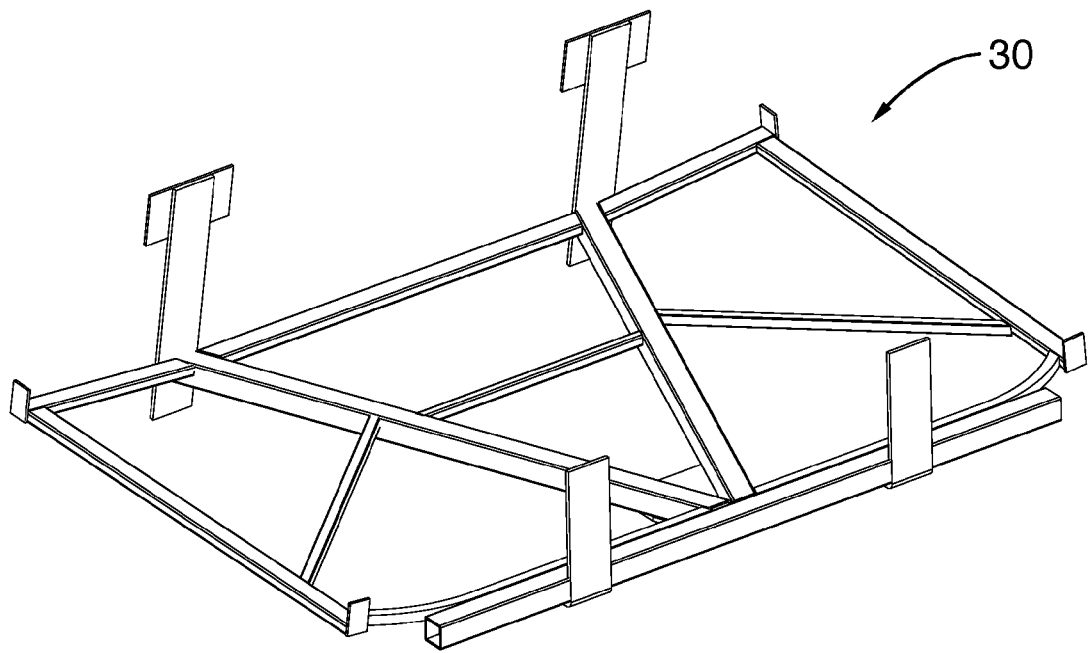
FIG. 6 is a perspective view of a pan used in the method.
Figure 7:
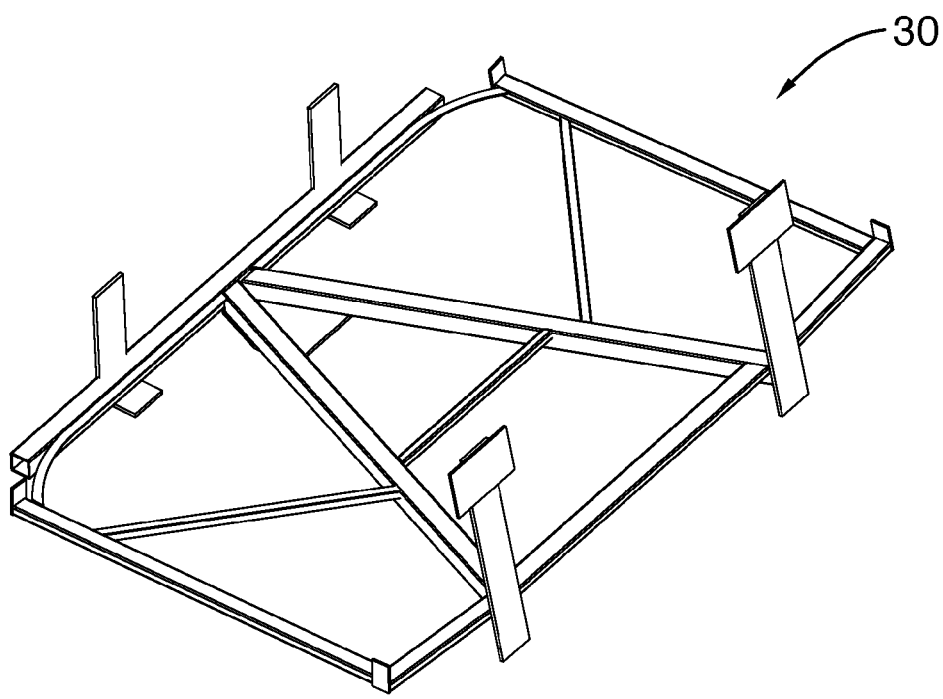
FIG. 7 is an interior view of the rear of the van of FIG. 1.
Figure 8:
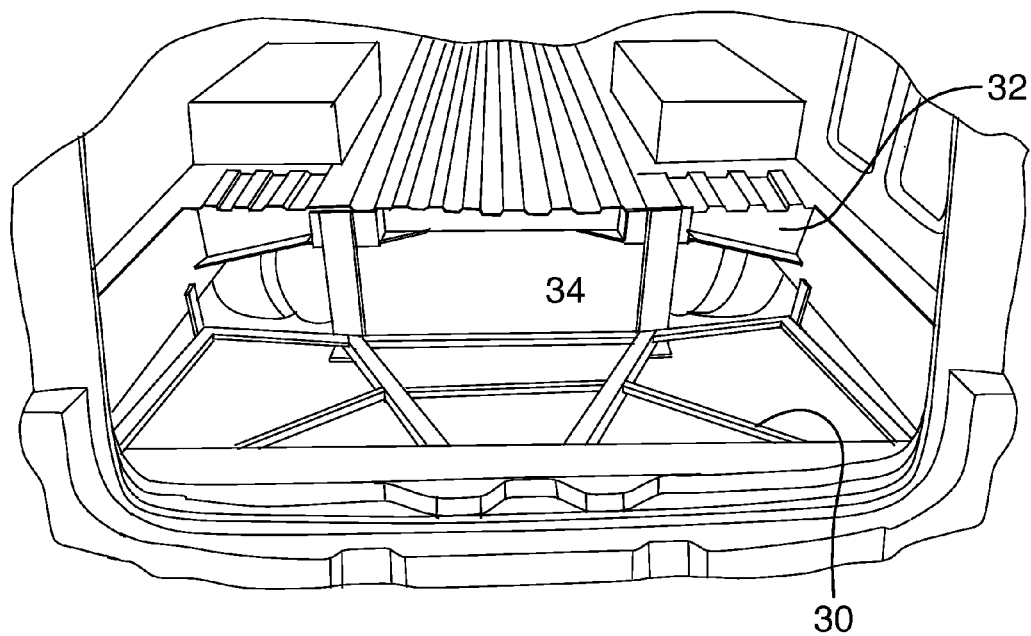
FIG. 8 is a view similar to FIG. 7 with a portion of the rear bed removed.
Figure 9:
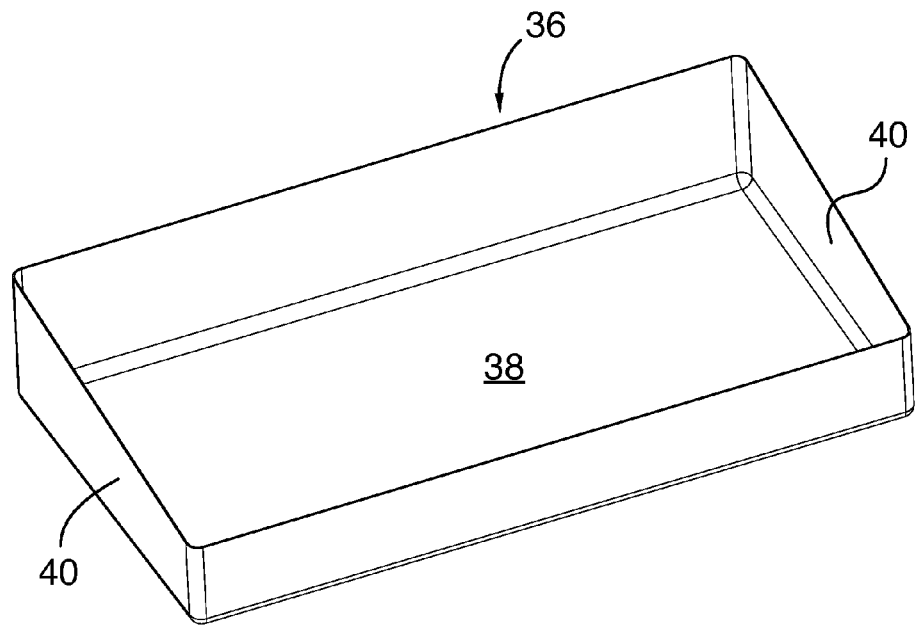
FIG. 9 is a view of the structure of FIG. 4 in use with the structure of FIG. 8.
Figure 10:
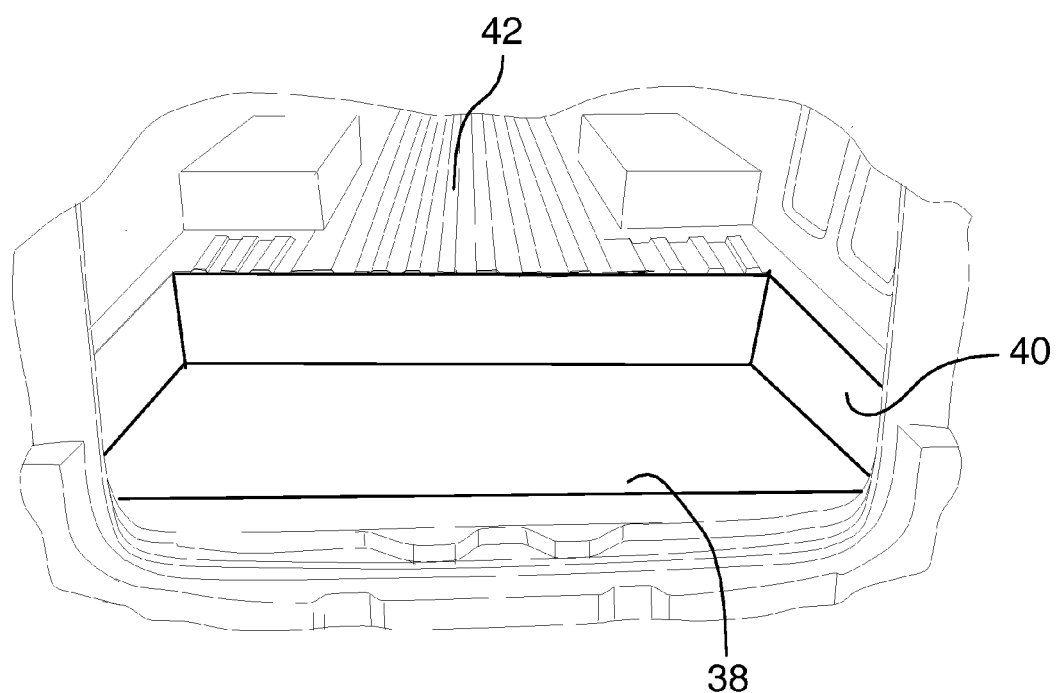
FIG. 10 is a view of the structure of FIG. 6 in use with the structure of FIG. 9.

Thereafter, a frame 30 of the type shown in FIGS. 6 and 7 is secured to the frame 32 of the van, by nut and bolt assemblies 34, all as shown in FIG. 8, and thereafter, a luggage pan 36, of the type shown in FIG. 9 is secured to the frame, as shown in FIG. 10. Notably, the luggage pan 36 will be seen to have a floor 38 that lies below the space occupied by the portion of the rear bed prior to removal thereof and to further have sidewalls 40 that sealingly couple the floor 38 of the pan 36 to the floor 42 of the vehicle. This provides a suitcase rack, that is, suitcases and the like can be stowed upon the pan (not shown).

Window Modification

Figure 11:
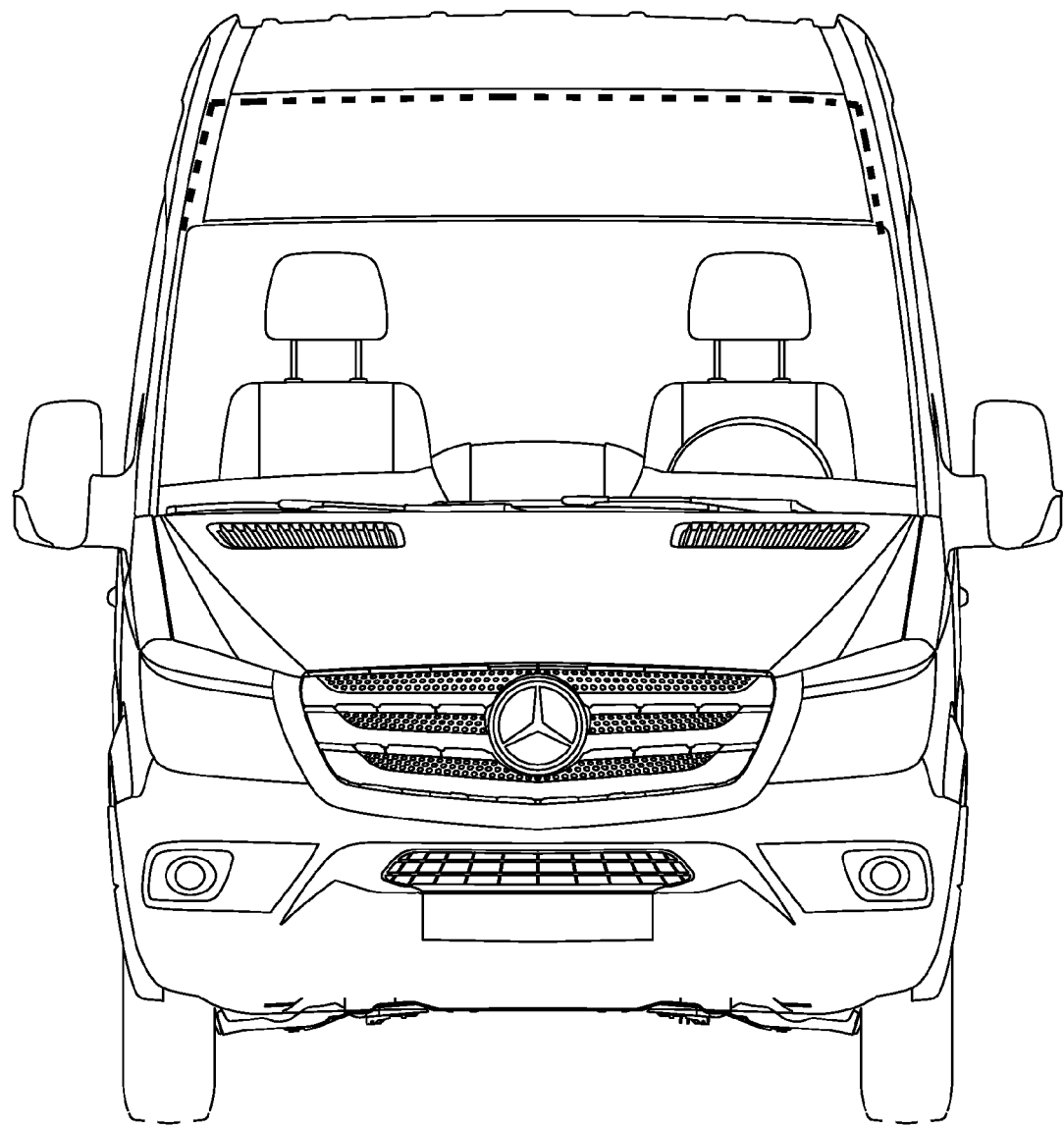
FIG. 11 is a front view of the van of FIG. 1.
Figure 12:
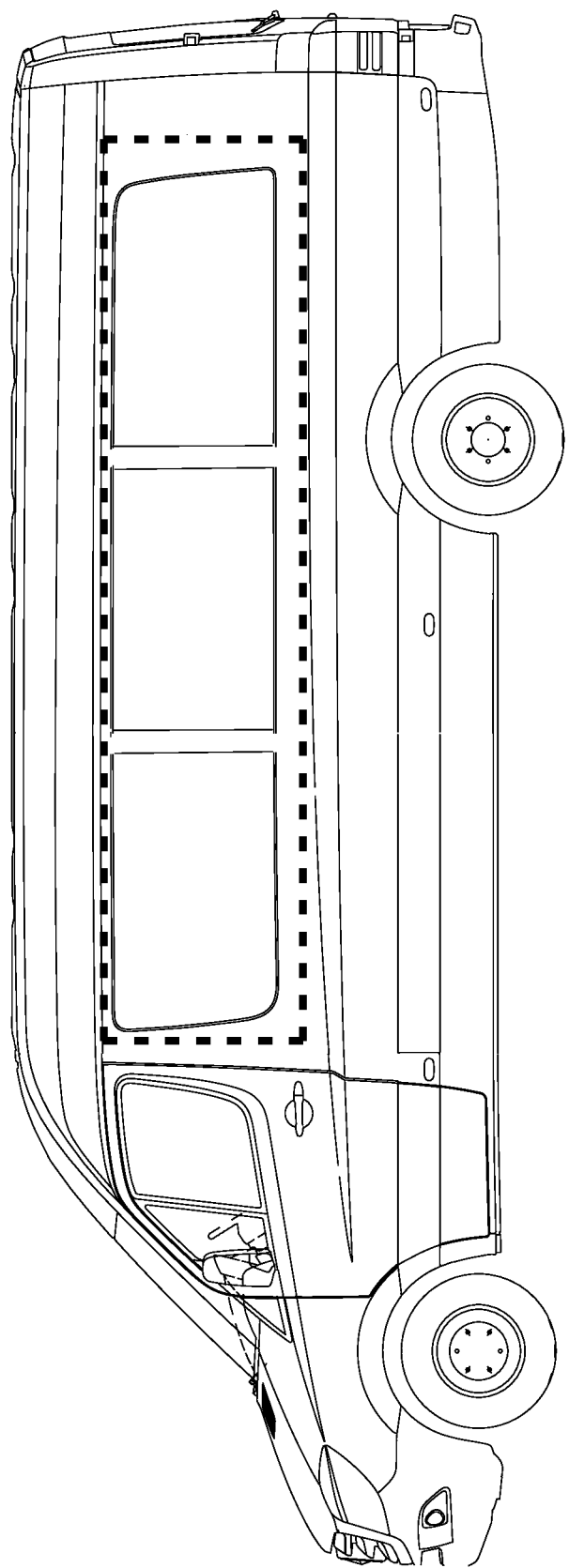
FIG. 12 is a side view of the van of FIG. 1.
Figure 12A:
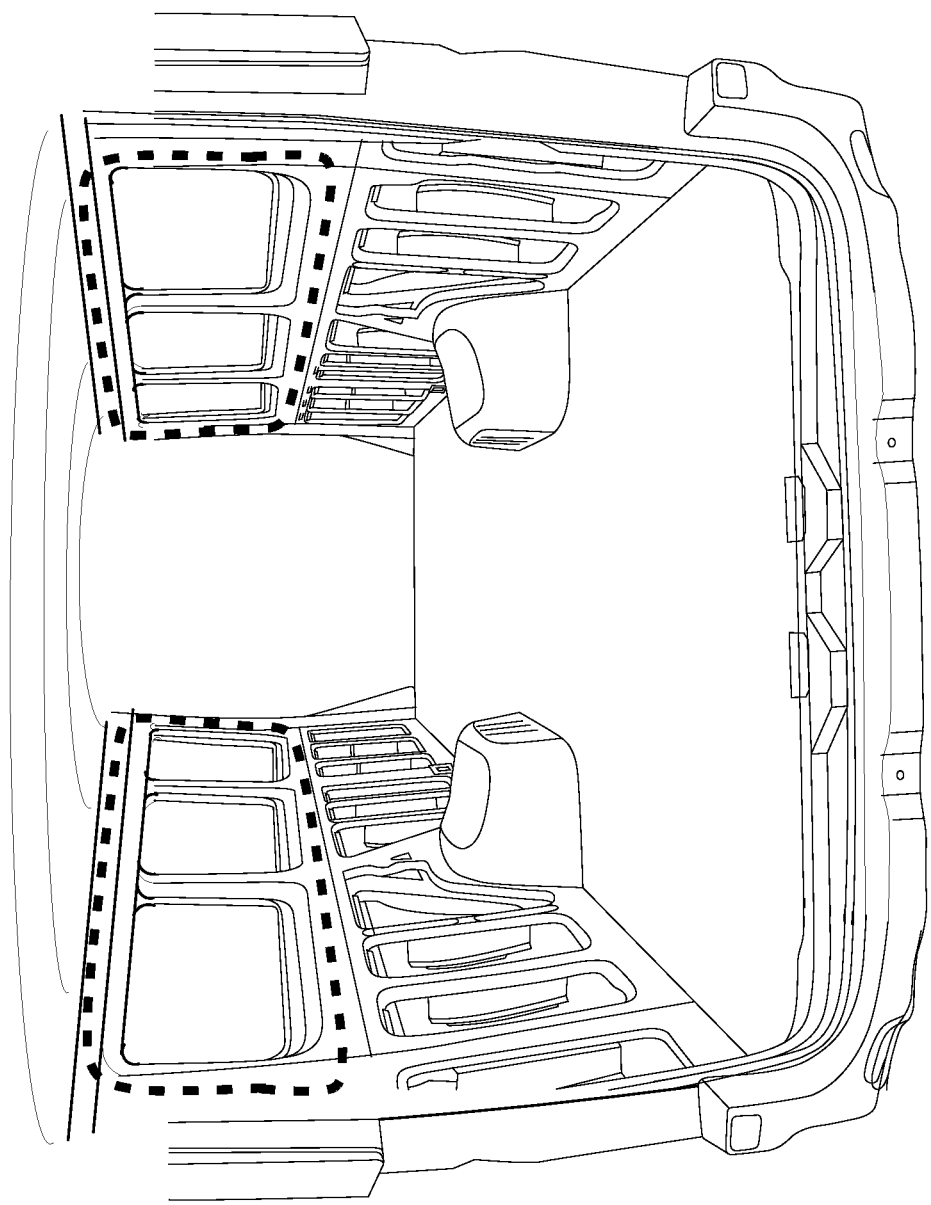
FIG. 12A is an interior view of the van of FIG. 1.
Figure 13:
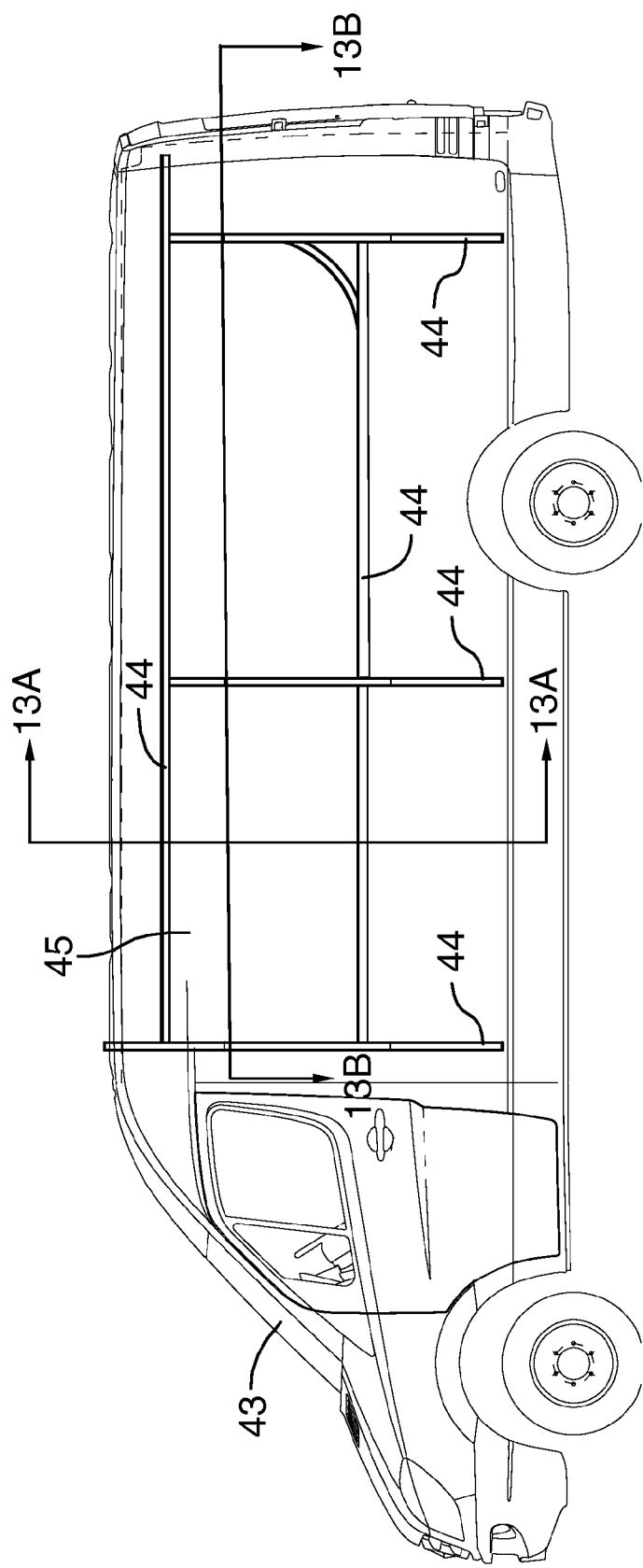
FIG. 13 is a side view of a van produced in accordance with the method, with certain interior components made visible.
Figure 13A:
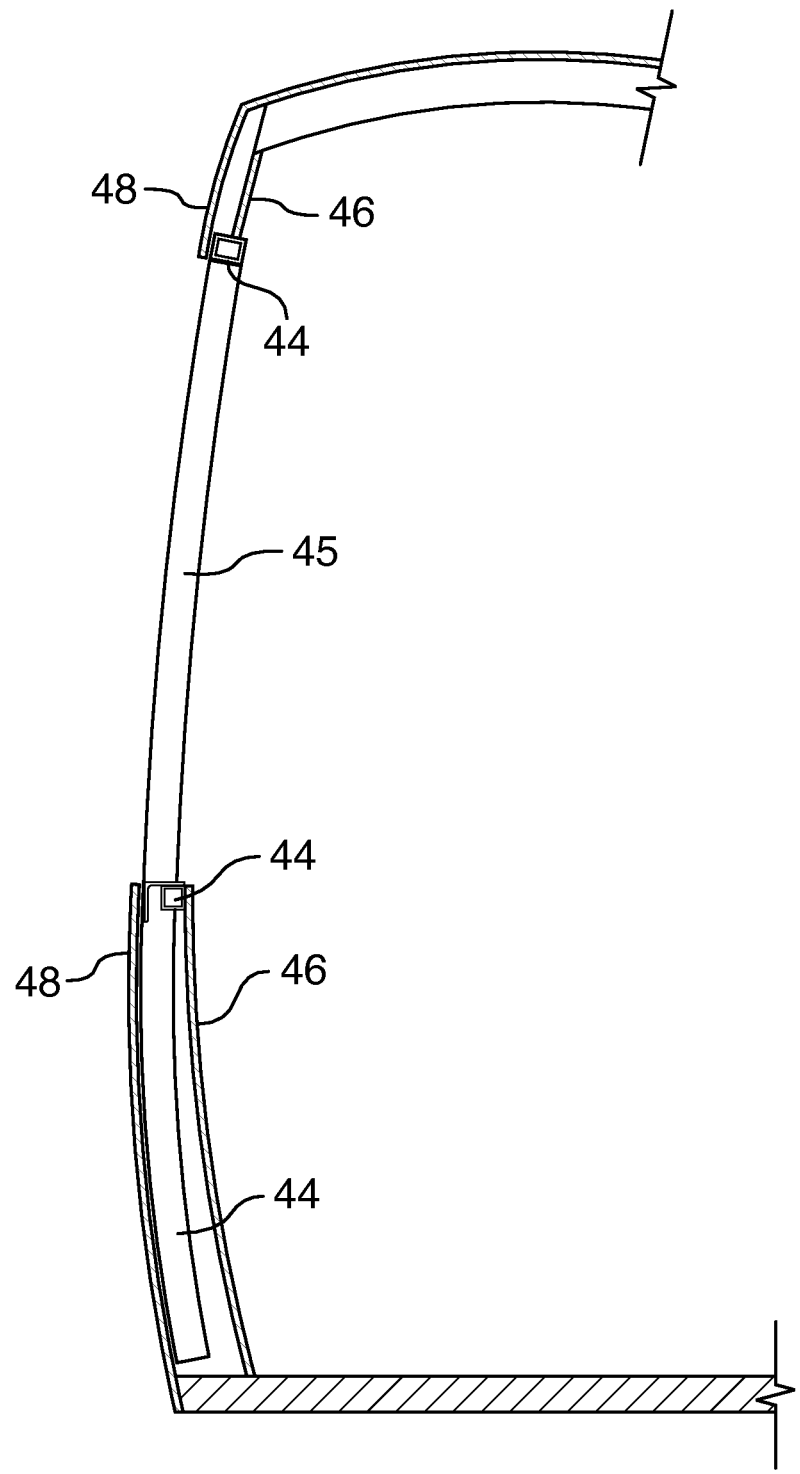
FIG. 13A is a view along 13A-13A of FIG. 13.
Figure 13:
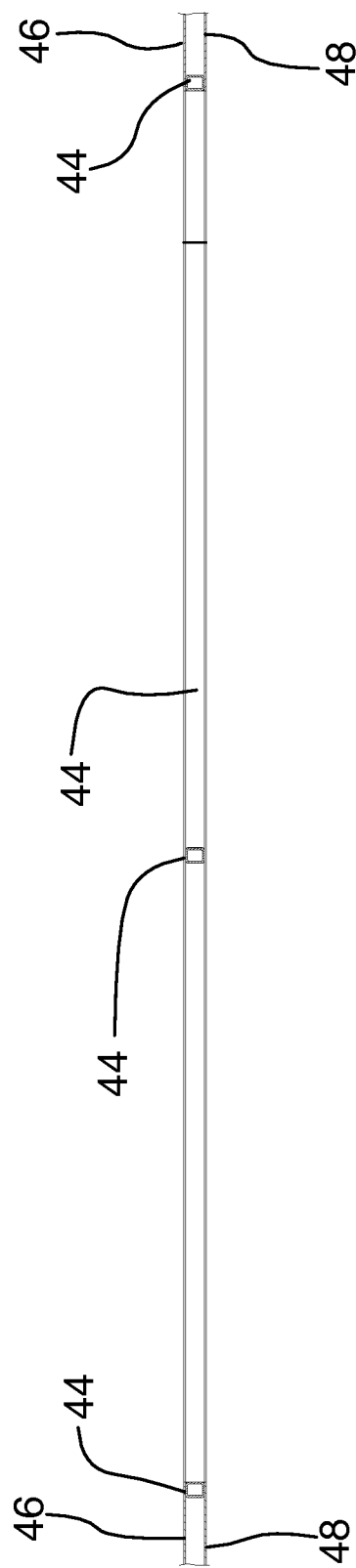
Figure 14:
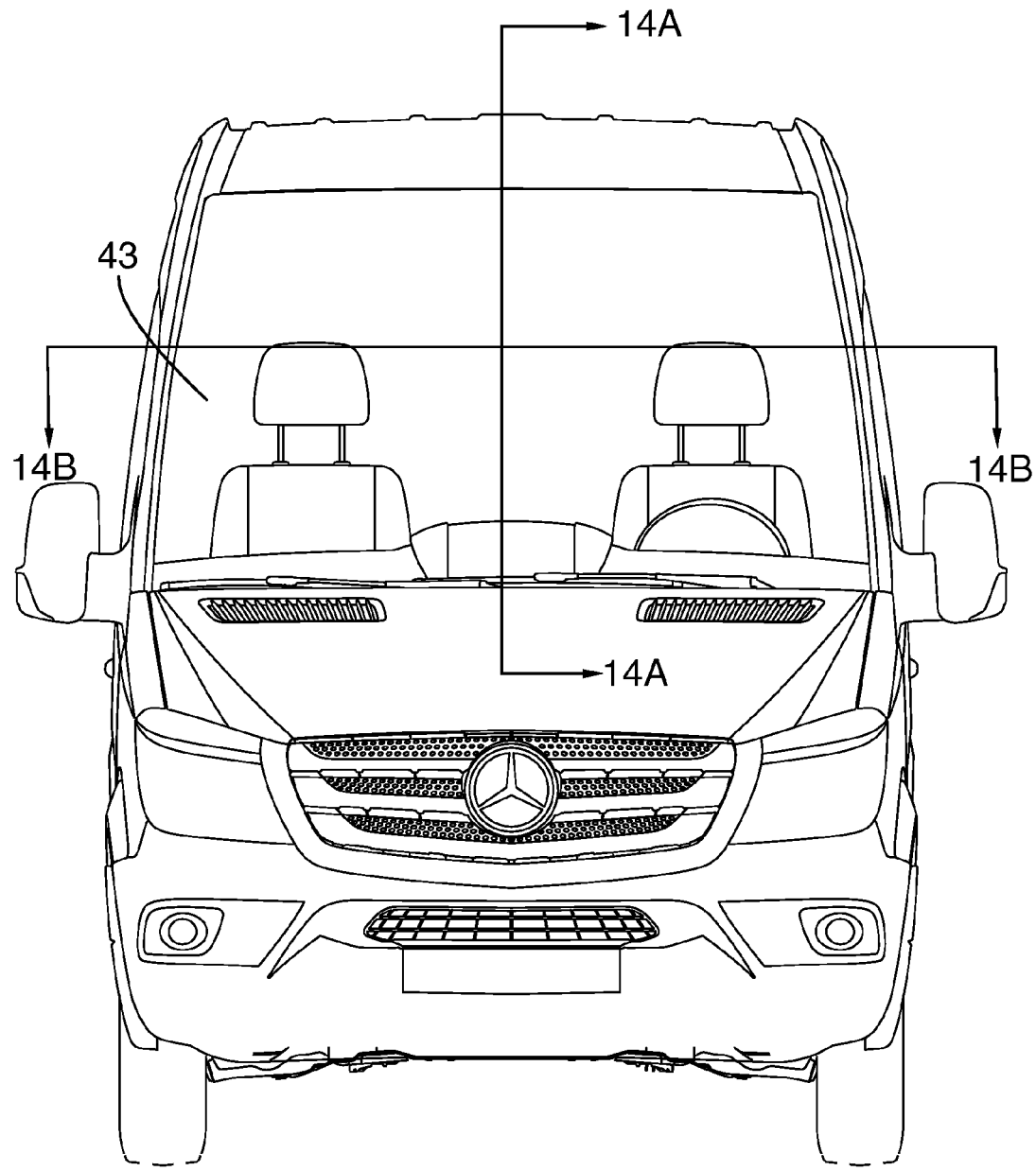
FIG. 14 is a front view of the van of FIG. 13.
Figure 14A:
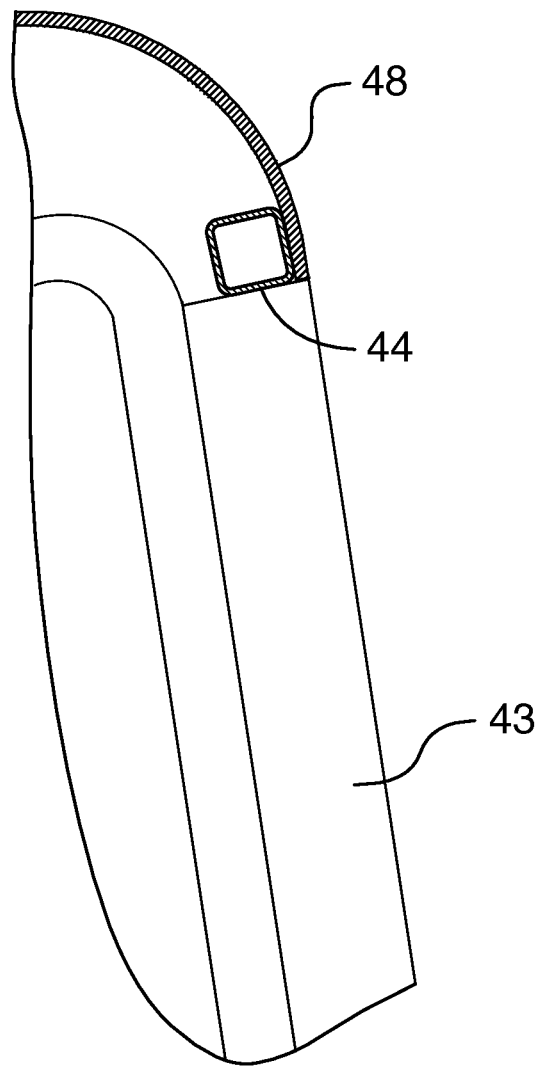
FIG. 14A is a view along 14A-14A of FIG. 14.
Figure 14B:
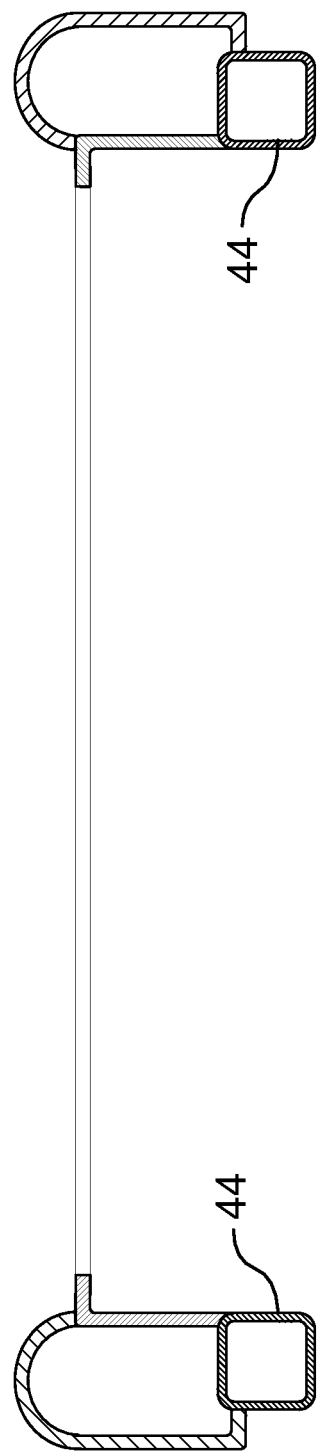
FIG. 14B is a view along 14B-14B of FIG. 14.
Figure 15:
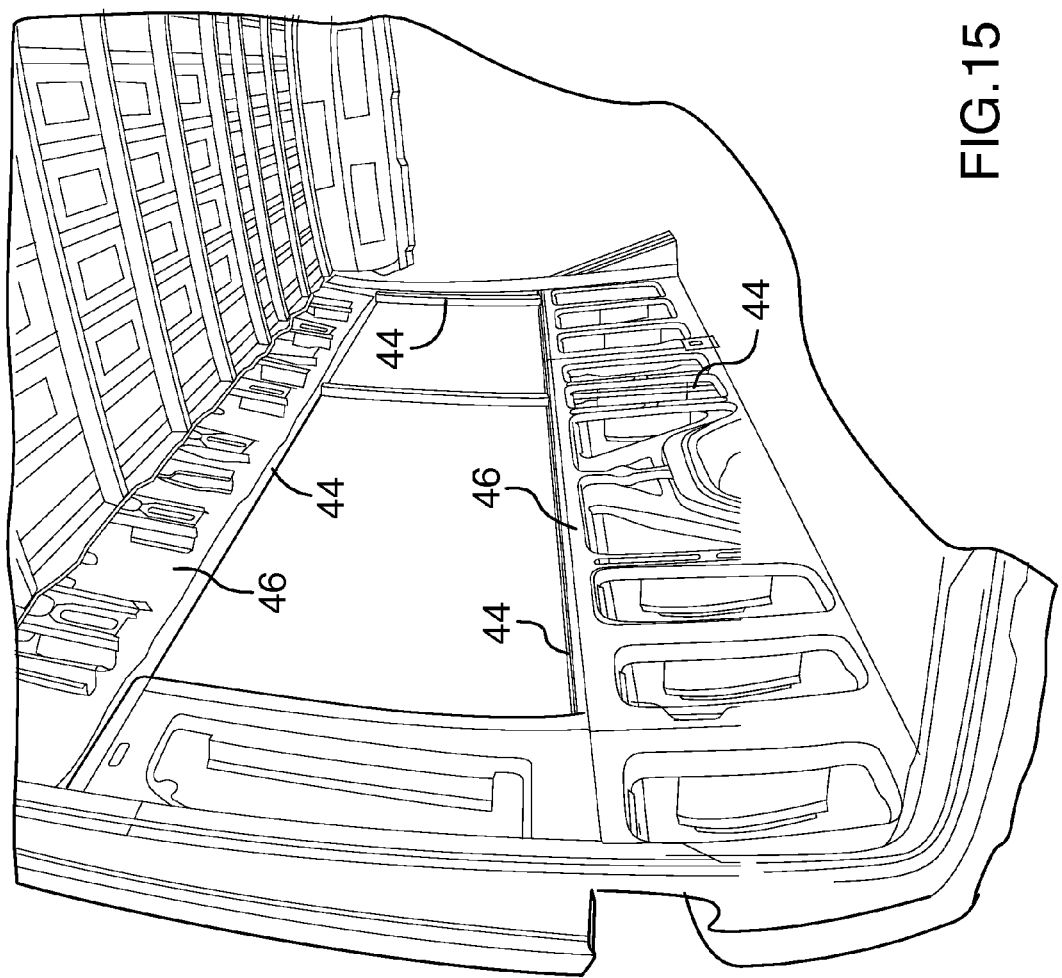
FIG. 15 is an interior view of a van at an intermediate stage of production.

The window modification comprises the removal of: a portion of the front cabin of the van, the portion lying above the front windshield of the van and spanning substantially between the sidewalls of the van; the windshield of the van; and the passenger windows. The portions removed are shown by the dotted lines in FIGS. 11, 12 and 12A Thereafter: (i) an oversized windshield 43 is installed in the space occupied by the windshield and the portion of the front cabin prior to removal thereof; and (ii) oversized windows 45 are installed in the sidewalls. Details of construction are shown in FIGS. 13A-15 wherein it will be seen that, inter alia, the openings are reinforced with structural steel members 44 that are welded between the inner 46 and outer 48 body skins.

Seat Modification

A preliminary step in the seat modification is the installation of a shelf 50 in the van in vertically spaced relation to the floor 38 of the pan 36 so as to define the upper extent of the suitcase rack, i.e. the suitcase rack is defined between the floor 38 of the pan 36 and the shelf 50. The shelf 50 is shown in FIG. 16.

Figure 16:
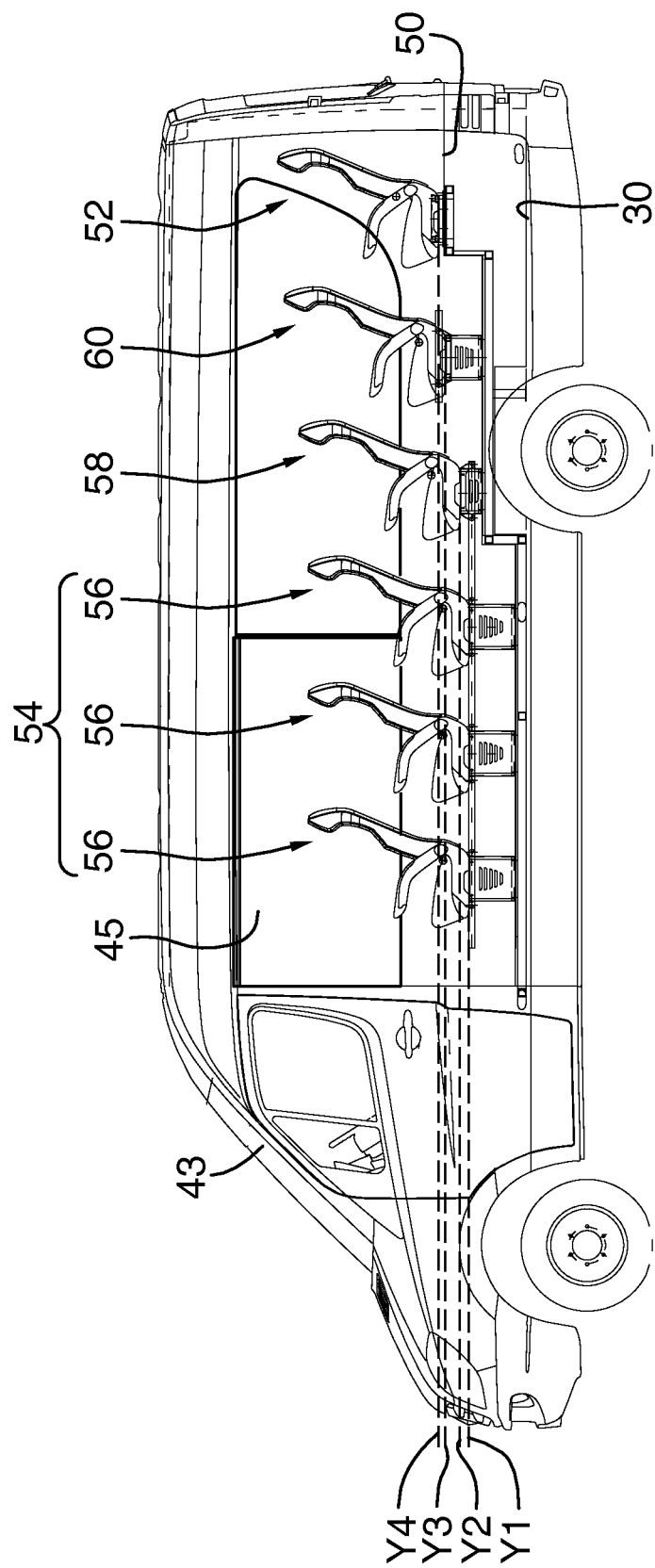
FIG. 16 is a side view of the van of FIG. 13 with the foreground sidewall removed for clarity.

Thereafter, as also shown in FIG. 16, a plurality of seats is installed in the van:
  one row 52 of seats is disposed upon the shelf 50
  a grouping of seats 54 is arranged behind the driver and disposed at an elevation Y1 below the elevation Y4 of the row 52 on the shelf, the grouping 54 being defined by three rows of seats 56,56,56;
  a row of seats 58 is arranged in front of the row 52 on the shelf 50, arranged immediately behind the grouping 54 and disposed at an elevation Y2 above that of the grouping 54 and below that of the row 52 on the shelf 50
  a row 60 of seats is arranged immediately in front of the row 52 on the shelf 50 and arranged immediately behind the row 58 of seats arranged immediately behind the grouping 54, the row 60 of seats arranged immediately in front of the row 52 on the shelf being disposed at an elevation Y3 below the elevation Y4 of the row 52 of seats on the shelf 50 and above the elevation Y2 of the row of seats immediately behind the grouping.

Figure 17:
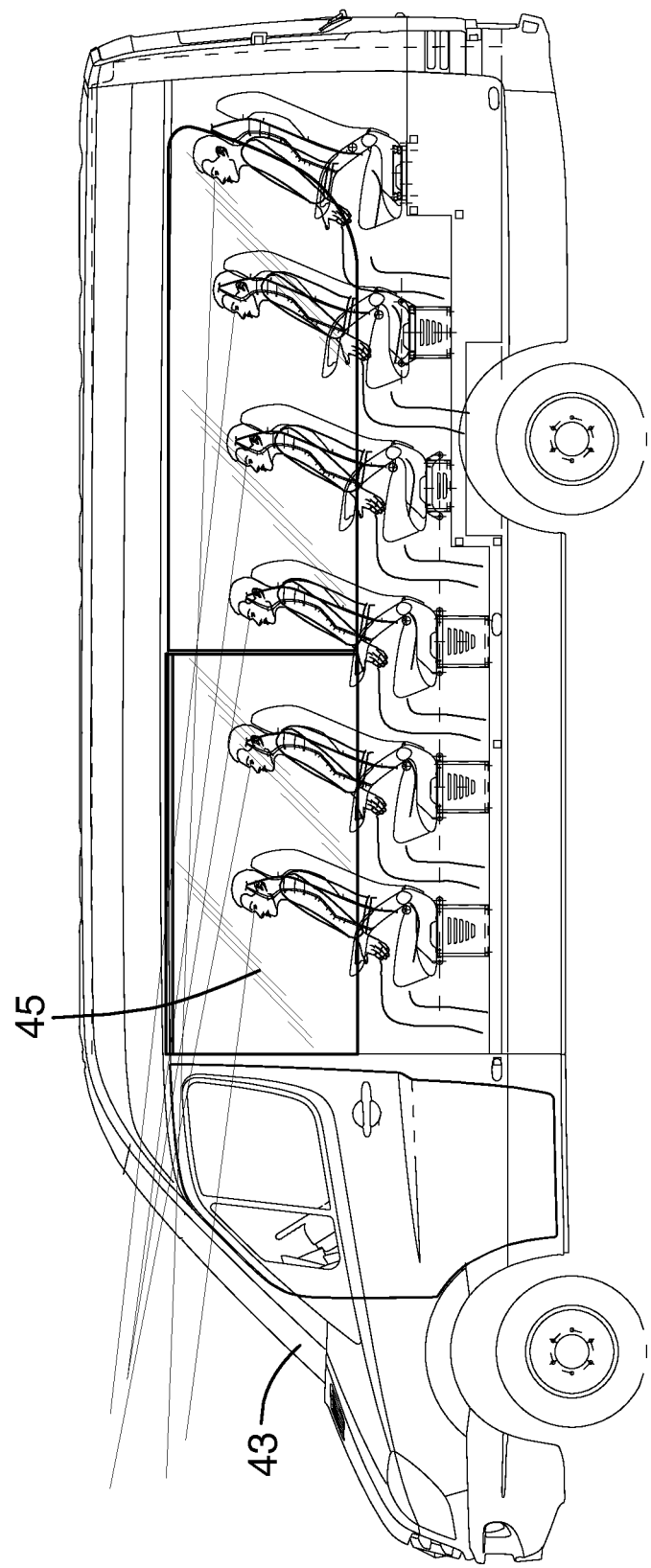
FIG. 17 is a view similar to FIG. 16.
Figure 18:
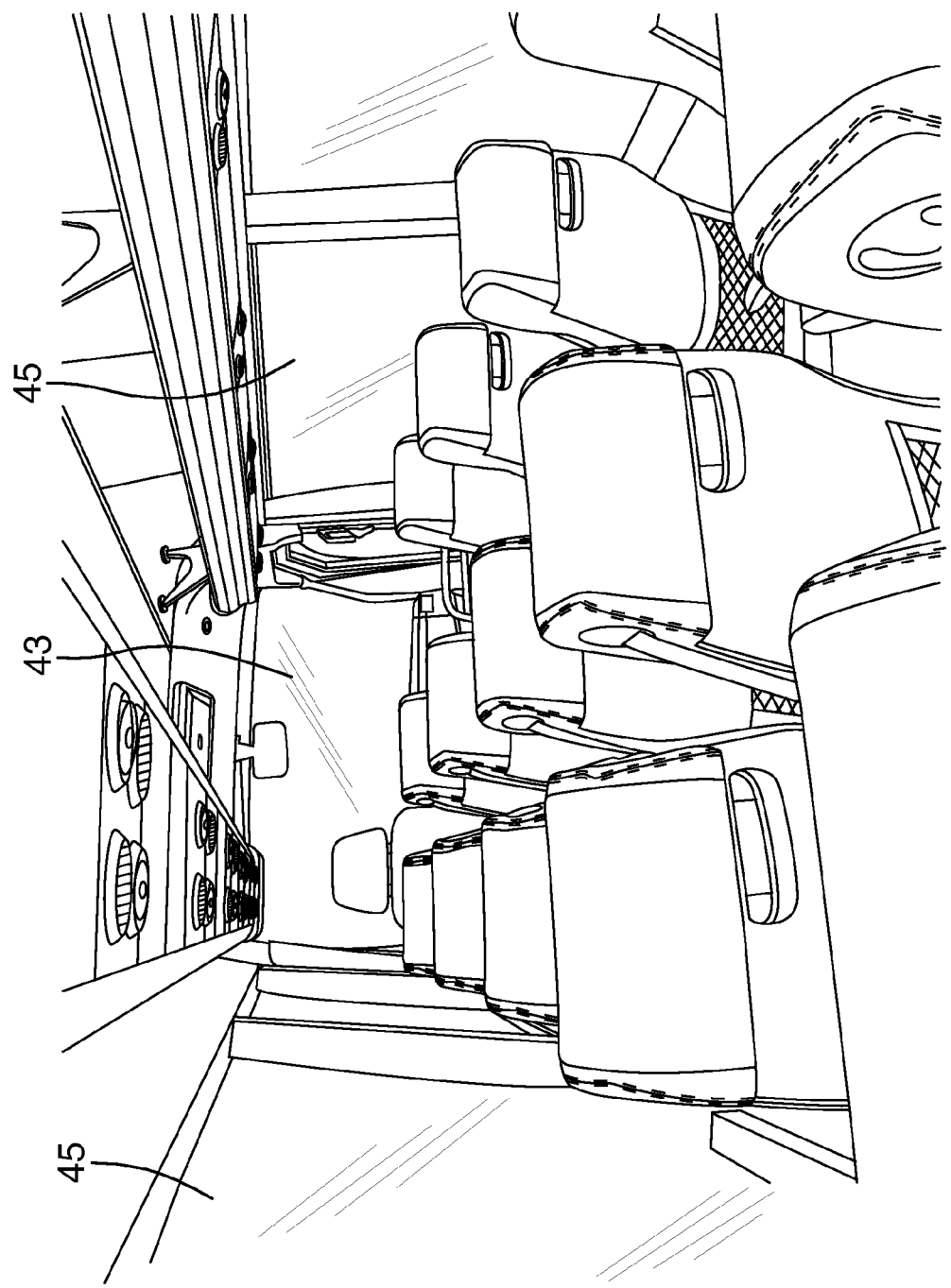
FIG. 18 is a view along arrow 18 of FIG. 17.

Persons of ordinary skill in the art will appreciate that the result of the foregoing provides a van of unusual advantage, including 19 seats, all with a good view, as shown in FIG. 17 and FIG. 18, as a result of the oversized windows and staggered seat elevations, and luggage space.

Whereas but a single embodiment is herein shown and described, it will be evident that variations are possible.

For example, whereas six rows of seats behind the driver are shown, a lesser number of seats can be provided; this would provide more luggage space and interior space per person.

As well, whereas the exemplary method is indicated to be use for a 2013 Sprinter™ van, it will be evident that the method could be used with other vans, including Sprinter™ vans of other years and other models of van.

Accordingly, the invention should be understood to be limited only by the appended claims, purposively construed.

The invention claimed is:

1. A method comprising steps of:
  removing a portion of a rear bed of a van, the portion of the rear bed lying immediately in front of rear doors of the van, behind rear wheels of the van and spanning substantially between side walls of the van;
  securing to a frame of the van a luggage pan, the pan having a floor that lies below a space occupied by the portion of the rear bed prior to removal thereof, the pan further having sidewalls that sealingly couple the floor of the pan to a floor of the vehicle; and
  installing a shelf in the van in vertically spaced relation to the floor of the pan to define a suitcase rack between the floor of the pan and the shelf.

2. The method according to claim 1, further comprising a step of installing a row of seats upon the shelf.

3. The method according to claim 2, further comprising steps of:
  removing a portion of a front cabin of the van, the portion of the front cabin lying above a windshield of the van and spanning substantially between the sidewalls of the van;
  removing the windshield of the van; and
  installing an oversized windshield in a space occupied by the windshield and the portion of the front cabin prior to removal thereof.

4. The method according to claim 1, wherein the van is selected from a group consisting of the 2500 and 3500 series manufactured by the Mercedes-Benz division of Daimler AG.

5. A modified van produced by a method comprising steps of:
  removing a portion of a rear bed of a van, the portion of the rear bed lying immediately in front of rear doors of the van, behind rear wheels of the van and spanning substantially between side walls of the van;
  securing to a frame of the van a luggage pan, the pan having a floor that lies below a space occupied by the portion of the rear bed prior to removal thereof, the pan further having sidewalls that sealingly couple the floor of the pan to a floor of the vehicle; and
  installing a shelf in the van in vertically spaced relation to the floor of the pan to define a suitcase rack between the floor of the pan and the shelf.

6. The modified van according to claim 5, wherein the van is selected from a group consisting of the 2500 and 3500 series manufactured by the Mercedes-Benz division of Daimler AG.

7. The modified van according to claim 5, further comprising:
  a first row of seats disposed on the shelf;
  a grouping of seats arranged behind a driver and disposed at an elevation below that of the first row of seats disposed on the shelf, the grouping being defined by at least two rows of seats; and
  a second row of seats arranged in front of the first row of seats disposed on the shelf, arranged immediately behind the grouping of seats and disposed at an elevation above an elevation of the grouping of seats and below an elevation of the first row of seats disposed on the shelf.

8. The modified van according to claim 7, further comprising a third row of seats arranged immediately in front of the first row of seats disposed on the shelf and arranged immediately behind the second row of seats arranged immediately behind the grouping of seats.

9. The modified van according to claim 8, wherein the grouping of seats is defined by three rows of seats.

10. The modified van according to claim 9, wherein the third row of seats arranged immediately in front of the first row of seats disposed on the shelf is disposed at an elevation below the elevation of the first row of seats disposed on the shelf and above the elevation of the second row of seats immediately behind the grouping of seats.

* * * * *